United States Patent
Yamaguchi et al.

(10) Patent No.: US 9,644,540 B2
(45) Date of Patent: May 9, 2017

(54) COLLECTOR AND GAS TURBINE PLANT PROVIDED WITH SAME

(71) Applicant: MITSUBISHI HITACHI POWER SYSTEMS, LTD., Kanagawa (JP)

(72) Inventors: Akinori Yamaguchi, Tokyo (JP); Kazuya Higashi, Tokyo (JP); Kiyonori Kushioka, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 323 days.

(21) Appl. No.: 14/419,728

(22) PCT Filed: May 23, 2013

(86) PCT No.: PCT/JP2013/064342
§ 371 (c)(1),
(2) Date: Feb. 5, 2015

(87) PCT Pub. No.: WO2014/041855
PCT Pub. Date: Mar. 20, 2014

(65) Prior Publication Data
US 2015/0211417 A1    Jul. 30, 2015

(30) Foreign Application Priority Data
Sep. 12, 2012 (JP) ................. 2012-200634

(51) Int. Cl.
*F02C 1/00* (2006.01)
*F02C 7/22* (2006.01)
(Continued)

(52) U.S. Cl.
CPC ............. *F02C 7/22* (2013.01); *B01D 45/02* (2013.01); *B01D 45/16* (2013.01); *F01D 25/32* (2013.01);
(Continued)

(58) Field of Classification Search
CPC ..... F02C 3/22; F02C 3/28; F02C 7/22; F02M 21/0227
(Continued)

(56) References Cited

U.S. PATENT DOCUMENTS 5,272,866 A * 12/1993 Nieminen ................. C10J 3/84
110/264
2008/0156187 A1    7/2008 Tingle et al.

FOREIGN PATENT DOCUMENTS

CN    1266144 A    9/2000
CN    1957204 A    5/2007
(Continued)

OTHER PUBLICATIONS

Office Action issued Feb. 5, 2016 in corresponding Korean Application No. 10-2015-7002133 (with English Translation).
(Continued)

*Primary Examiner* — Pascal M Bui Pho
*Assistant Examiner* — Edwin Kang
(74) *Attorney, Agent, or Firm* — Wenderoth, Lind & Ponack, L.L.P.

(57) ABSTRACT

A collector 3 that collects particles P contained in a fluid includes: a bent pipe 31 that guides the fluid flowing from a first direction X in a second direction Z; a branch pipe 32 that causes the fluid guided in the second direction Z to branch into the second direction Z and a third direction Y; a collection pipe 34 in which the particles P in the fluid guided in the second direction Z by the branch pipe 32 are collected; and a reduction-expansion pipe 33 which is arranged between the bent pipe 31 and the branch pipe 32 and of which the flow path is narrowed while being biased to an inlet side of the bent pipe 31.

6 Claims, 6 Drawing Sheets

(51) Int. Cl.
*F01D 25/32* (2006.01)
*B01D 45/02* (2006.01)
*B01D 45/16* (2006.01)
*B01D 45/04* (2006.01)

(52) U.S. Cl.
CPC .............. *F02C 7/222* (2013.01); *B01D 45/04* (2013.01); *F05D 2220/32* (2013.01); *F05D 2240/35* (2013.01); *F05D 2260/607* (2013.01)

(58) Field of Classification Search
USPC ............ 55/434, 462, DIG. 23; 210/801, 311, 210/532.1, 533
See application file for complete search history.

(56) References Cited

FOREIGN PATENT DOCUMENTS

| | | |
|---|---|---|
| JP | 53-142982 | 12/1978 |
| JP | 57-113820 | 7/1982 |
| JP | 61157310 A * | 7/1986 ......... B01D 21/0033 |
| JP | 62-136218 | 6/1987 |
| JP | 2-4612 | 1/1990 |
| JP | 2-218803 | 8/1990 |
| JP | 5-501745 | 4/1993 |
| JP | 8-28208 | 1/1996 |
| JP | 11-324616 | 11/1999 |
| JP | 2000-257403 | 9/2000 |
| JP | 2005-180485 | 7/2005 |
| JP | 2008-169834 | 7/2008 |

OTHER PUBLICATIONS

Navor Blog, "Section 1. Outline of a Gas Turbine", http://blog.naver.com/PostView.nhn?blogId=elect94&logNo=70015778066, Mar. 27, 2007.
First Office Action issued Sep. 6, 2015 in Chinese Application No. 201380039083.9 (with English translation).
International Search Report issued Sep. 3, 2013 in corresponding International Application No. PCT/JP2013/064342.
Translation of Written Opinion of the International Searching Authority issued Sep. 3, 2013 in corresponding International Application No. PCT/JP2013/064342.

* cited by examiner

COLLECTOR AND GAS TURBINE PLANT PROVIDED WITH SAME

TECHNICAL FIELD

The present invention relates to a collector that collects particles contained in a fluid and a gas turbine plant provided with the same. Priority is claimed on Japanese Patent Application No. 2012-200634, filed Sep. 12, 2012, the content of which is incorporated herein by reference.

BACKGROUND ART

Techniques of collecting particles contained in a fluid that flows through piping or the like include, for example, those described in PTLs 1 and 2.

PTL 1 describes a method of separating and removing particles contained in a steam current.

In this method, a main steam pipe is bent in a vertical direction from a horizontal direction. Moreover, in this method, after bending, the main steam pipe is branched into the vertical direction and the horizontal direction to create flow paths in the vertical direction and the horizontal direction.

Accordingly, steam and particles in the main steam pipe are changed in flow direction from the horizontal direction to the vertical direction by a bent part, and flow straight in a vertically downward direction under the influence of an inertia force and gravity generated in the vertical direction. Thereafter, most of the particles in the steam continue flowing straight in the vertically downward direction within a branch part. Meanwhile, since the steam is not influenced by the inertia force and gravity as much as the particles, the steam flows to the main steam pipe, which is branched in the horizontal direction, while containing some of the particles at the branch part. Accordingly, the particles in the steam that flows in the horizontal direction after the branching can be reduced.

Additionally, PTL 2 describes a method of separating and collecting fine metal powder that is mixed in air during noble metal polishing work, such as ring processing or dental technical work.

In this method, mainly the fine metal powder is separated and collected by changing the wind speed or wind direction of the air that has collected and suctioned dust. That is, after the air that contains the fine metal powder flows straight into a separation and collection device from an air inflow part thereof, the air is increased in wind speed by passing through a hole of which the diameter is reduced. Thereafter, the air is changed in wind direction to a direction intersecting a straight-ahead direction and is discharged by a dust suction machine. On the other hand, since the fine metal powder with high density cannot follow such rapid changes in wind speed and wind direction and flows straight due to its inertia force without changing its direction to the same direction as the air, the fine metal powder can be collected in a metal powder recovery part arranged at an end in the straight-ahead direction.

CITATION LIST

Patent Literature

[PTL 1] Japanese Unexamined Patent Application, First Publication No. H8-28208

[PTL 2] Japanese Unexamined Patent Application, First Publication No. S57-113820

SUMMARY OF INVENTION

Technical Problem

However, since neither of the methods of PTLs 1 and 2 has high collection efficiency, collectors having a high collection rate are desired.

The present invention has been made in order to meet the above desire, and an object thereof is to provide a collector that can improve collection efficiency and a gas turbine plant provided with the same.

Solution to Problem

A collector related to one aspect of the invention for responding to the above desire is a collector that collects particles contained in a fluid. The collector includes: a bent pipe that turns the direction of the fluid flowing in a first direction to a second direction that is directed to a vertically lower side than the first direction; a reduction-expansion pipe that is connected to an outlet of the bent pipe and expands a flow path of the fluid flowing in the second direction after reducing the flow path of the fluid; a branch pipe that is connected to an outlet of the reduction-expansion pipe and causes the fluid flowing in the second direction to branch into the second direction and a third direction that is a direction different from the second direction; and a collection part that is connected to an outlet of the branch pipe on the second direction side and collects the particles in the fluid. Here, a flow path reduction part in the reduction-expansion pipe is eccentric with respect to a center of an inlet opening of the reduction-expansion pipe, and when viewed in the second direction, an eccentric position of the flow path reduction part is within a range of 90° to 270° from the first direction, with the center of the inlet opening as a reference.

Additionally, a collector related to another aspect of the invention for responding to the above desire is a collector that collects particles contained in a fluid. The collector includes: a bent pipe that turns the direction of the fluid flowing in a first direction to a second direction that is directed to a vertically lower side than the first direction; a reduction-expansion pipe that is connected to an outlet of the bent pipe and expands a flow path of the fluid flowing in the second direction after reducing the flow path of the fluid; a branch pipe that is connected to an outlet of the reduction-expansion pipe and causes the fluid flowing in the second direction to branch into the second direction and a third direction that is a direction different from the second direction; and a collection part that is connected to an outlet of the branch pipe on the second direction side and collects the particles in the fluid. Here, when viewed in the second direction, a flow path reduction part in the reduction-expansion pipe is eccentric toward a side in a radial direction from a center of an inlet opening of the reduction-expansion pipe which is an inlet side of the bent pipe with the center as a reference.

The expression "a radial direction from a center of an inlet opening of the reduction-expansion pipe" means a radial direction that is a direction away from the center of the inlet opening, in a plane parallel to a virtual plane including the inlet opening of the reduction-expansion pipe.

According to the one aspect or the other aspect, as a first stage, the particles contained in the fluid flowing in the first direction are turned in flow direction to the second direction when passing through the bent pipe. For this reason, the particles flow in the second direction in a state where the particles are biased and collected to a side opposite to the inlet side of the bent pipe due to a centrifugal force. Thereafter, as a second stage, the particles are biased and collected to the inlet side of the bent pipe, which is a side opposite to the side on which the particles has flowed through the bent pipe, while the centrifugal force is applied again thereto, in the process of flowing through the flow path reduction part of the reduction-expansion pipe while flowing in the second direction.

After passing through the flow path reduction part of the reduction-expansion pipe, the particles flow in the second direction while being influenced by gravity, in a state where the particles are biased to the inlet side of the bent pipe while the flow path thereof remains substantially narrowed. For this reason, the particles hardly flow in the third direction. Meanwhile, since the fluid is not influenced by gravity or the centrifugal force as much as the particles and flows while being diffused after passing through the flow path reduction part of the reduction-expansion pipe, the fluid flows in the third direction while passing through the branch pipe. Accordingly, since most of the particles are collected in the collection part connected to the outlet of the branch pipe on the second direction side, the collection efficiency of particles can be improved.

The "first direction" and the "third direction" herein are directions including more horizontal direction components than the "second direction".

Here, in the collector of the one aspect or the other aspect, when viewed in the second direction, the third direction is preferably within a range of 90° to 270° from an eccentric position of the flow path reduction part, with a center of an outlet opening of the reduction-expansion pipe as a reference.

Here, in the collector of the one aspect or the other aspect, when viewed in the second direction, an outlet of the branch pipe on the third direction side is preferably opposite to an eccentric position of the flow path reduction part, with a center of an outlet opening of the reduction-expansion pipe as a reference.

According to these collectors, the particles that are biased and collected when passing through the flow path reduction part of the reduction-expansion pipe flow in the second direction at a distance from the outlet of the branch pipe on the third direction side when passing through the branch pipe. Hence, in these collectors, since the particles are hardly mixed in the branch flow path of the branch pipe on the third direction side, and the particles mostly flow to the branch flow path of the branch pipe on the second direction side, the collection efficiency can be further improved.

Moreover, a gas turbine plant related to still another aspect of the invention for meeting the above desire includes: a gas turbine having a compressor, a turbine, and a combustor; a gas line that supplies gas fuel as the fluid to the combustor; and any one collector of the above collectors arranged in the gas line.

According to this aspect, since any one of the above collectors is arranged in the gas line, the particles in the gas fuel can be removed, and the gas fuel from which the particles are removed can be supplied to the combustor.

Advantageous Effects of Invention

According to one aspect related to the invention, the collection efficiency of particles contained in a fluid can be improved.

BRIEF DESCRIPTION OF DRAWINGS

FIG. 3(a) is a schematic view of Example 1, FIG. 3(b) is a schematic view of Example 2, FIG. 3(c) is a schematic view of Example 3, FIG. 3(d) is a schematic view of Example 4, FIG. 3(e) is a schematic view of Comparative Example 1, FIG. 3(f) is a schematic view of Comparative Example 2, and FIG. 3(g) is a schematic view of Comparative Example 3.

DESCRIPTION OF EMBODIMENT

An embodiment related to the invention will be described below with reference to FIGS. 1 and 2.

Figure 1:
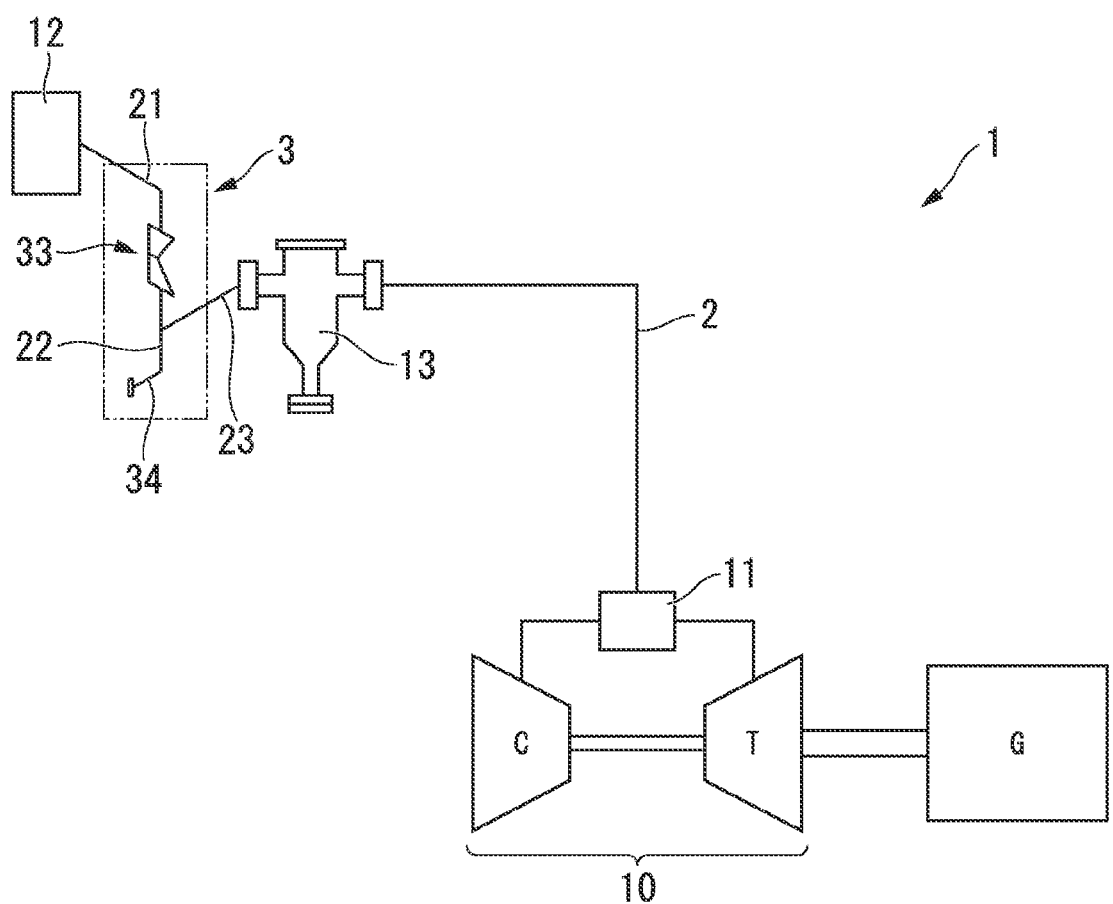
FIG. 1 is a system diagram of a gas turbine plant including a collector related to one embodiment of the invention.

As illustrated in FIG. 1, a gas turbine plant 1 including a collector 3 of the present embodiment includes a gas turbine 10 having a compressor C, a turbine T, and a combustor 11, a generator G that is connected to the gas turbine 10, a gas line 2 that is a fuel line that supplies gas fuel F, which is a fluid, to the combustor 11, a gas tank 12 that is connected to the gas line 2 and is a supply source of the gas fuel F, a strainer 13 that is arranged in the gas line 2, and the collector 3 that is arranged in the gas line 2 between the gas tank 12 and the strainer 13.

Figure 2:
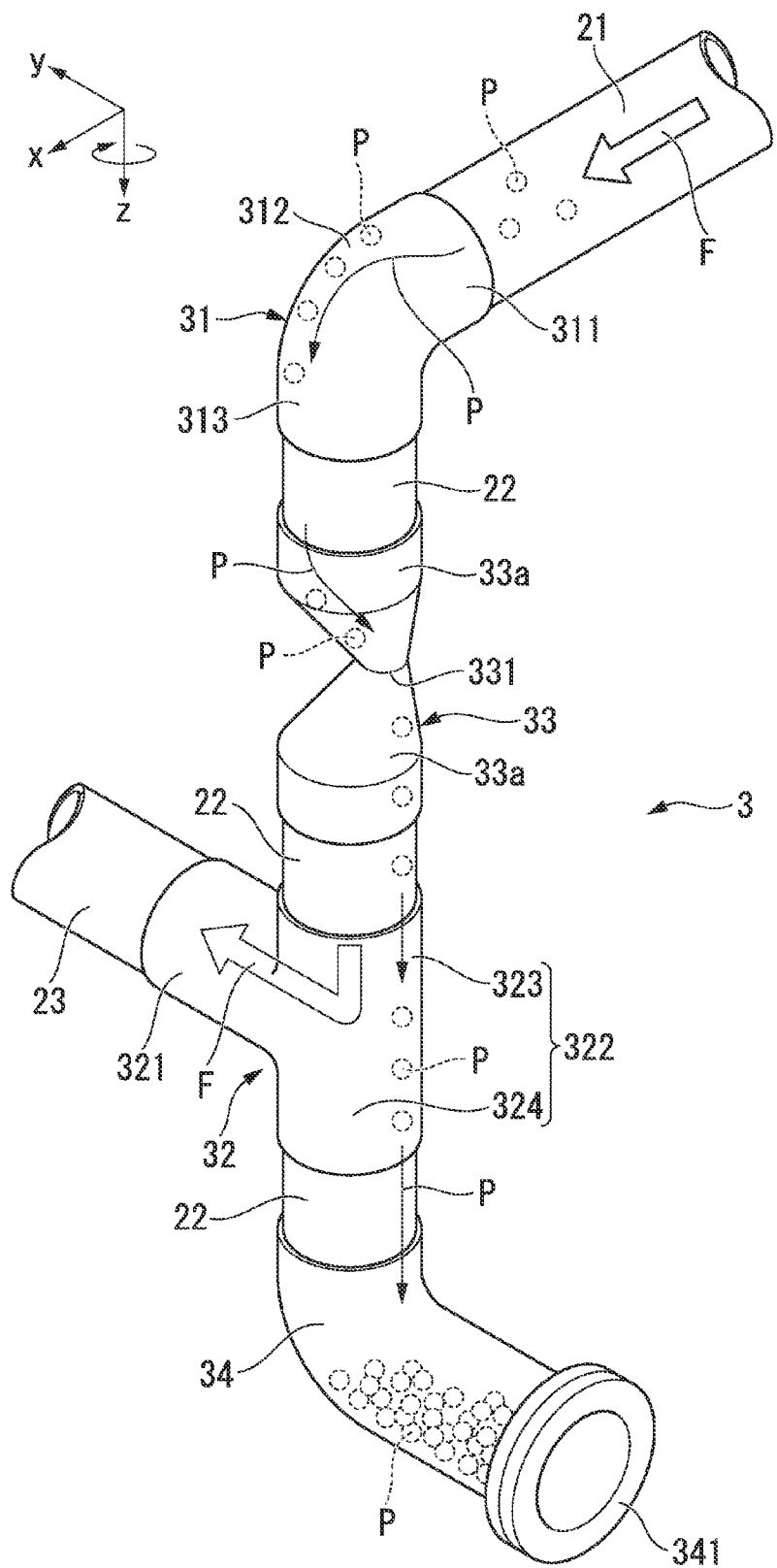
FIG. 2 is a perspective view of the collector related to the one embodiment of the invention.

As illustrated in FIG. 2, the collector 3 of the present embodiment is arranged in the gas line 2. The collector 3 includes a bent pipe 31 that changes the direction of a flow from a first line 21 that extends in a first direction X to a second direction Z, a second line 22 that extends in the second direction Z from the bent pipe 31, a branch pipe 32 that branches the second line 22 into the second direction Z and a third line 23 that extends in a third direction Y, a reduction-expansion pipe 33 that is arranged in the second line 22 between the bent pipe 31 and the branch pipe 32, and a collection pipe (collection part) 34 that is connected to the second line 22 side of the branch pipe 32.

Here, the lines 21, 22, and 23 will be simply described altogether.

The first line 21 is a portion of the gas line 2. The first line 21 is connected to the gas tank 12 and the bent pipe 31 and is arranged to extend in the first direction X that is a lateral side.

The second line 22 is arranged to extend in the second direction Z, which is a vertically downward direction, inside the collector 3.

The third line 23 is a portion of the gas line 2. The third line 23 is connected to the branch pipe 32 and the strainer 13 (illustrated in FIG. 1), and is arranged to extend in the third direction Y that is a lateral side and is orthogonal to the first direction X and the second direction Z.

The bent pipe 31 is formed of an L-shaped elbow that is bent in an L shape that forms a circular cross-sectional shape. The bent pipe 31 has a bent pipe inlet part 311 that is an inlet side and is connected to the first line 21, a bent part 312 that bends the direction of a flow to the second direction Z, and a bent pipe outlet part 313 that is an outlet side and is connected to the second line 22.

The branch pipe 32 is formed of a T-shaped piping joint that forms a circular cross-sectional shape. The branch pipe 32 has a straight pipe part 322 that extends in the second direction Z, and an outlet pipe part 321 that extends in the third direction Y from the middle of the straight pipe part 322. The straight pipe part 322 has a straight pipe inlet part 323 that extends in a vertically upward direction and is connected to the second line 22 on the bent pipe 31 side, and a straight pipe outlet part 324 that extends in the vertically downward direction and is connected to the second line 22 on the collection pipe 34 side. The outlet pipe part 321 is arranged to extend in the third direction Y from the middle of the straight pipe part 322 and is connected to the third line 23.

The reduction-expansion pipe 33 is arranged between the bent pipe 31 and the branch pipe 32 in the second line 22. The reduction-expansion pipe 33 is formed of a pair of eccentric reducers 332 with the diameter-reduced sides connected to each other. In the reduction-expansion pipe 33, a connecting portion where the diameter-reduced sides of the eccentric reducers 332 are connected to each other forms the flow path reduction part 331. An axis center of the flow path reduction part 331 is arranged at a position that is biased toward a side of the bent pipe inlet part 311 that is in a radial direction in the second line 22 and is an inlet side of the bent pipe 31 in the first direction X from a central axis C of the second line 22.

In the eccentric reducers 332, the cross-sectional area size of the flow path reduction part 331 may be appropriately selected and used in accordance with the size of particles P or the like to be removed from the gas fuel F.

The collection pipe 34 is a pipe material that is bent in an L shape that forms a circular cross-sectional shape. The collection pipe 34 is arranged at a lower end of the second line 22 that is an end of the straight pipe outlet part 324 in the branch pipe 32. The collection pipe 34 has one opening connected to the lower end of the second line 22 and has an opening and closing lid 341 in the other opening.

Next, the operation of the gas turbine plant 1 including the collector 3 of the above configuration will be described.

According to the gas turbine plant 1 including the collector 3 as described above, the gas fuel F containing the particles P that are impurities is supplied from the gas tank 12, flows through the first line 21 that is the gas line 2, and reaches the collector 3. The gas fuel F that has reached the collector 3 flows into the bent pipe 31 from the bent pipe inlet part 311, is changed in flow direction by the bent part 312 of the bent pipe 31, and flows out from the bent pipe outlet part 313 to the second line 22. Then, the gas fuel F passes through the flow path reduction part 331 with a narrowed flow path within the reduction-expansion pipe 33, and flows into the branch pipe 32 from the straight pipe inlet part 323. The gas fuel F that flows through the branch pipe part 32 is changed in flow direction within the branch pipe 32, and flows out to the third line 23 via the outlet pipe part 321. Thereafter, the gas fuel F flows through the third line 23, reaches the combustor 11 via the strainer 13 and is combusted in the combustor. The turbine T is driven by the combustion gas generated through the combustion of the gas fuel F, and power generation using the generator G is performed by the driving of the turbine T.

Most of the particles P contained in the gas fuel F are sent not from the outlet pipe part 321 but from the straight pipe outlet part 324 to the collection pipe 34 within the branch pipe 32, are collected within the collection pipe 34, and are recovered by detaching the opening and closing lid 341 of the collection pipe 34.

According to the collector 3 as described above, a centrifugal force is applied to the particles P contained in the gas fuel F in the bent part 312 when the particles pass through the bent pipe 31. For this reason, when the particles P contained in the gas fuel F are guided from the bent pipe outlet part 313 to the second line 22, the particles fall while being biased and collected on the side opposite to the bent pipe inlet part 311 in a radial direction with respect to the central axis C of the second line 22 (refer to FIG. 4). Then, when the particles P pass through the reduction-expansion pipe 33, since the flow path reduction part 331 is arranged so as to be eccentric toward the side of the bent pipe inlet part 311 in the radial direction with respect to the central axis C of the second line 22, the particles P, which have fallen while being biased and collected, flow to the bent pipe inlet part 311 side while a centrifugal force is applied again thereto along the shape of the reduction-expansion pipe 33. Moreover, the particles P pass through the flow path reduction part 331 of which the flow path is narrowed, and are thereby further biased to the side of the bent pipe inlet part 311 and collected while the flow path is narrowed, and fall in the vertically downward direction while remaining biased to the side of the bent pipe inlet part 311 under the influence of gravity after passing through the flow path reduction part 331.

On the other hand, the gas fuel F is not influenced by gravity or the centrifugal force as much as the particles P and flows while being diffused after passing through the flow path reduction part 331.

The outlet pipe part 321 of the branch pipe 32 is connected to the straight pipe part 322 toward the third direction Y. Additionally, an inlet opening of the outlet pipe part 321 that is a connecting portion with the straight pipe part 322 is arranged at a position of 90° from the flow path reduction part 331 that is biased to the side of the bent pipe inlet part 311, with the central axis C of the second line 22 as a reference. Since the particles P fall while being biased and collected to the bent pipe inlet part 311 side inside the straight pipe part 322 of the branch pipe 32, the particles flow at a distance from the inlet opening of the outlet pipe part 321, and hardly flow to the outlet pipe part 321 that is a lateral side of the straight pipe part 322.

On the other hand, as mentioned above, since the gas fuel F is not influenced by gravity or the centrifugal force as much as the particles P and flows while being diffused after passing through the flow path reduction part 331, the gas fuel flows from the outlet pipe part 321 to the third line 23 when passing through the branch pipe 32.

Accordingly, when the gas fuel F is made to flow to the outlet pipe part 321, the particles P are not easily mixed in and does not flow with the gas fuel. As a result, since most of the particles P are collected in the collection pipe 34 attached to the second line 22, the collection efficiency of the particles P can be improved.

Additionally, in the gas turbine plant 1 of the present embodiment, as described above, most of the particles P contained in the gas fuel F are removed by the collector 3 arranged in the gas line 2 from the gas tank 12 to the strainer 13. Moreover, the particles P are also removed from the gas fuel F that has passed through the collector 3, using the strainer 13. Hence, in the gas turbine plant 1 of the present embodiment, the gas fuel F containing almost no particles P can be supplied to the combustor 11.

EXAMPLES

Next, results of a computer analysis on the collection rates of various examples and comparative examples will be described.

First, the structures of various Examples 1 to 4 and various Comparative Examples 1 to 3 will be described.

Figure 3:
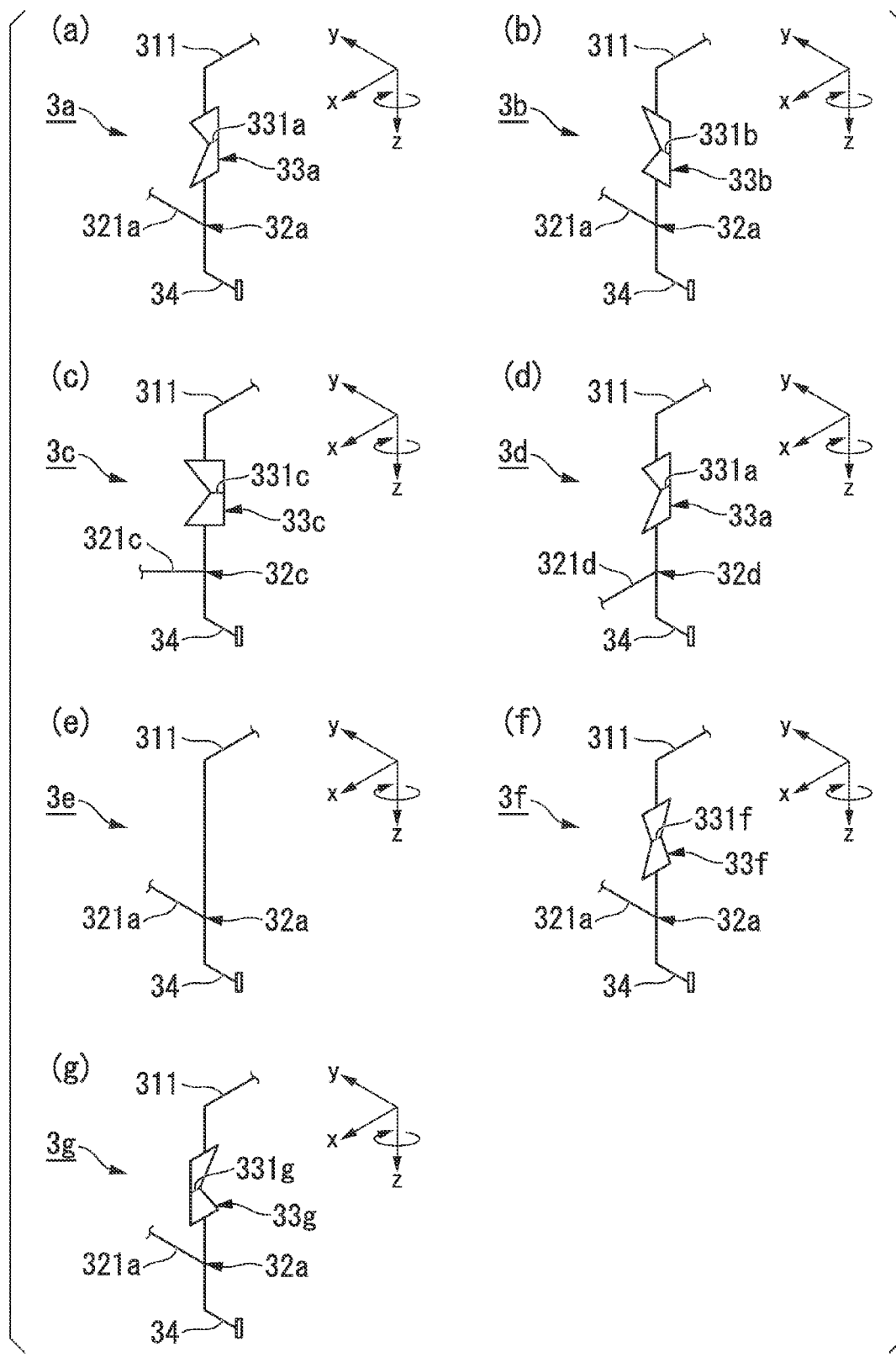
FIGS. 3(a) to 3(g) are schematic views of collectors of respective Examples 1 to 4 of the invention and Comparative Examples 1 to 3; specifically.
Figure 4:
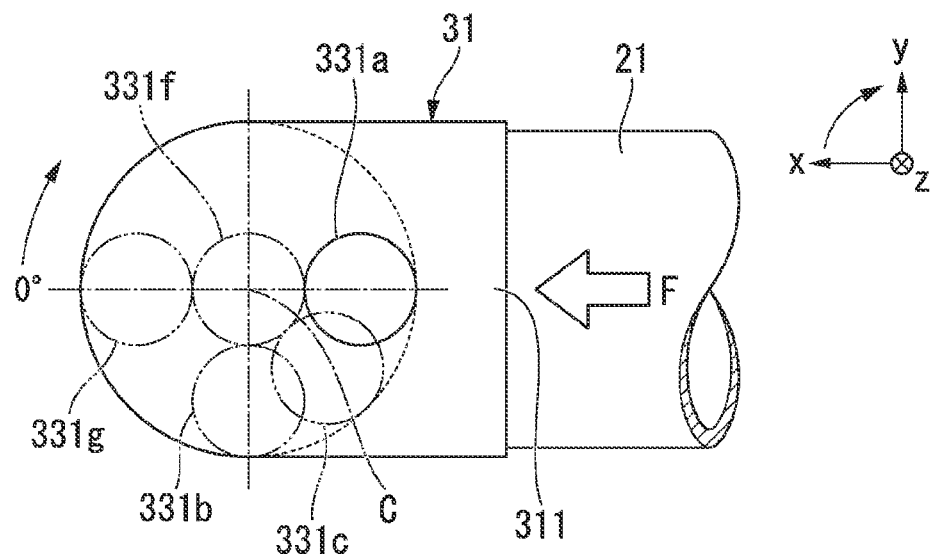
FIG. 4 is an explanatory view illustrating the positional relationship between a bent pipe and a flow path reduction part of a reduction-expansion pipe in Examples 1 to 4 of the invention and Comparative Examples 2 and 3.
Figure 5:
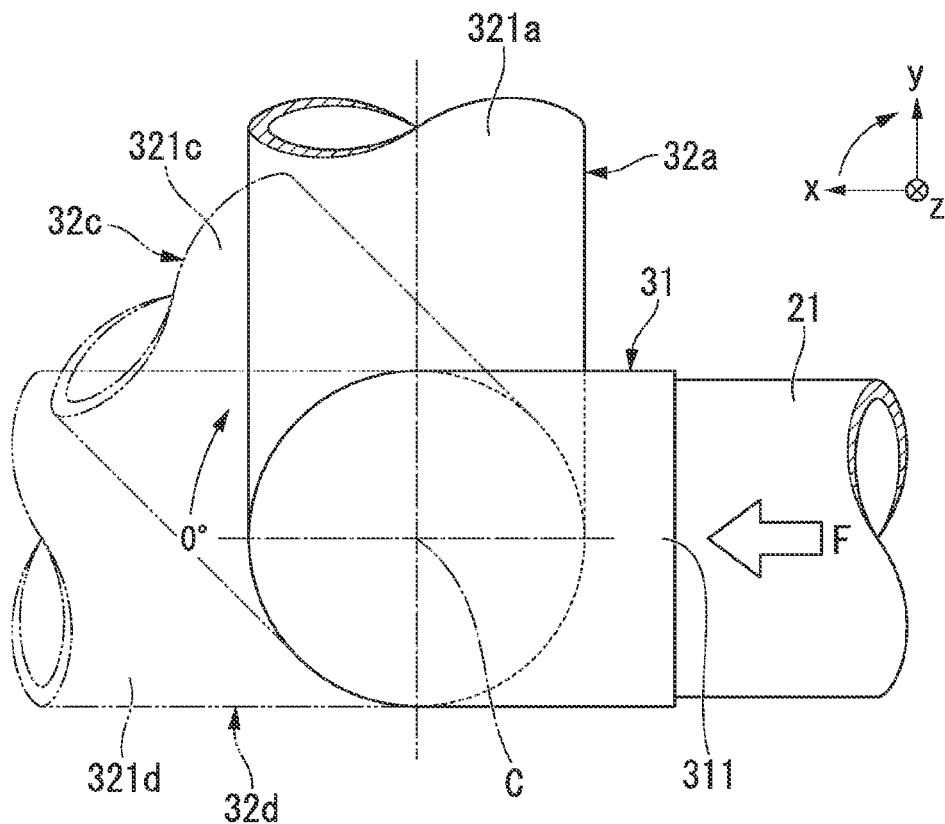
FIG. 5 is an explanatory view illustrating the positional relationship between the bent pipe and an outlet pipe part in Examples 1, 3, and 4 of the invention.

Here, as illustrated in FIGS. 3 to 5, the angle representation shows the clockwise angles around the central axis C from the first direction X)(0°, viewed in the second direction Z, with the central axis C of the second line 22 (refer to FIGS. 4 and 5) as a reference. All of the center of the bent pipe outlet part 313 (or outlet opening) of the bent pipe 31, and the center of the inlet part (or inlet opening) and the center of the outlet part (or outlet opening) in the reduction-expansion pipe are located at the central axis C of the second line 22.

Example 1

As illustrated in FIGS. 3(*a*), 4, and 5, a collector 3*a* of Example 1 includes a reduction-expansion pipe 33*a* in which a flow path reduction part 331*a* is arranged at the position of 180° from the first direction X. Additionally, the collector 3*a* includes a branch pipe 32*a* having an outlet pipe part 321*a* connected thereto in the direction of 90° from the first direction X.

The collector 3*a* of Example 1 is the same as the collector 3 described in the present embodiment.

Example 2

As illustrated in FIGS. 3(*b*), 4, and 5, a collector 3*b* of Example 2 includes a reduction-expansion pipe 33*b* in which a flow path reduction part 331*b* is arranged at the position of 270° from the first direction X. Additionally, the collector 3*b*, similarly to Example 1, includes the branch pipe 32*a* having the outlet pipe part 321*a* connected thereto in the direction of 90° from the first direction X. That is, the collector 3*b* of Example 2 is different from that of Example 1 in terms of the position of the flow path reduction part 331*b* in the reduction-expansion pipe 33*b*.

Example 3

As illustrated in FIGS. 3(*c*), 4, and 5, a collector 3*c* of Example 3 includes a reduction-expansion pipe 33*c* in which a flow path reduction part 331*c* is arranged at the position of 225° from the first direction X. Additionally, the collector 3*c* includes a branch pipe 32*c* having an outlet pipe part 321*c* connected thereto in the direction of 45° from the first direction X. That is, the collector 3*c* of Example 3 is different from that of Example 1 in terms of the position of the flow path reduction part 331*c* in the reduction-expansion pipe 33*c* and the branch pipe 32*c*.

Example 4

As illustrated in FIGS. 3(*d*), 4, and 5, a collector 3*d* of Example 4, similarly to Example 1, includes the reduction-expansion pipe 33*a* in which the flow path reduction part 331*a* is arranged at the position of 180° from the first direction X. Additionally, the collector 3*d* includes a branch pipe 32*d* having an outlet pipe part 321*d* connected thereto in the first direction X, that is, in the direction of 0°. That is, the collector 3*d* of Example 4 is different from that of Example 1 in terms of the branch pipe 32*d*.

Comparative Example 1

As illustrated in FIGS. 3(*e*), 4, and 5, a collector 3*e* of Comparative Example 1 does not include the reduction-expansion pipe 33. Additionally, the collector 3*e* includes the branch pipe 32*a* having the outlet pipe part 321*a* connected thereto in the direction of 90° from the first direction X. That is, the collector 3*e* of Comparative Example 1 is different from that of Example 1 in that the reduction-expansion pipe 33 is not included.

Comparative Example 2

As illustrated in FIGS. 3(*f*), 4, and 5, a collector 3*f* of Comparative Example 2 includes a reduction-expansion pipe 33*f* in which a flow path reduction part 331*f* is arranged on the central axis C of the second line 22. The reduction-expansion pipe 33*f* is formed of a pair of concentric reducers with the diameter-reduced sides connected to each other. Additionally, the collector 3*f*, similarly to Example 1, includes the branch pipe 32*a* having the outlet pipe part 321*a* connected thereto in the direction of 90° from the first direction X. That is, the collector 3*f* of Comparative Example 2 is different from Example 1 in that the flow path reduction part 331*f* is not eccentric with respect to the central axis C of the second line 22.

Comparative Example 3

As illustrated in FIGS. 3(*g*), 4, and 5, a collector 3*g* of Comparative Example 3 includes a reduction-expansion pipe 33*g* in which a flow path reduction part 331*g* is arranged in the first direction X, that is, at the position of 0°. Additionally, the collector 3*g*, similarly to Example 1, includes the branch pipe 32*a* having the outlet pipe part 321*a* connected thereto in the direction of 90° from the first direction X. That is, the collector 3*g* of Comparative Example 3 is different from that of Example 1 in terms of the position of the flow path reduction part 331*g* in the reduction-expansion pipe 33*g*.

The results obtained by comparing the collection rates of the examples and the comparative examples with one another through computational fluid dynamics (CFD) analysis are illustrated in FIGS. 6 to 9.

Figure 6:
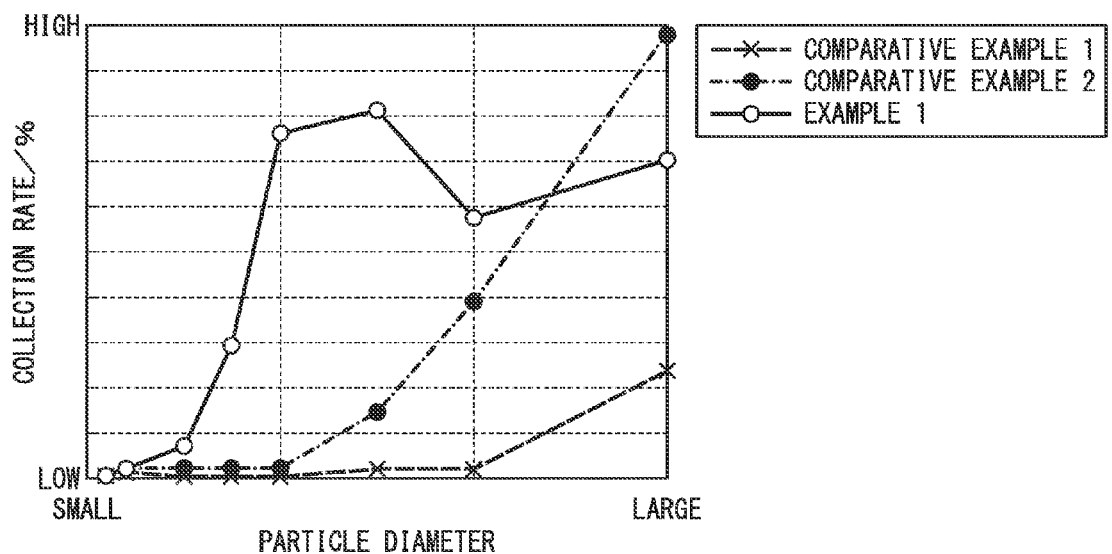
FIG. 6 is a graph illustrating the relationship between particle diameters and collection rates in Comparative Examples 1 and 2 and Example 1 of the invention.

As illustrated in FIG. 6, the collection rates with respect to particle diameters were compared with one another regarding Example 1 and Comparative Examples 1 and 2. When the collector 3*e* of Comparative Example 1 that includes no reduction-expansion pipe 33, and the collector 3a of Example 1 and the collector 3f of Comparative Example 2 that include the reduction-expansion pipe 33 compared with each other, Example 1 and Comparative Example 2 including the reduction-expansion pipe 33 showed higher collection rates. Moreover, when Example 1 and Comparative Example 2 were compared with each other, the reduction-expansion pipe 33 of Example 1 in which the flow path reduction part 331a is arranged at the position eccentric from the central axis C of the second line 22 showed higher collection rates than the reduction-expansion pipe 33 of Comparative Example 2 in which the flow path reduction part 331f is arranged on the central axis C of the second line 22. In particular, it was confirmed that the difference between the collection rates appears more markedly as the particle diameters are smaller, and Example 1 in which the flow path reduction part 331a is arranged at the position eccentric from the central axis C of the second line 22 exhibits high collection rates.

Figure 7:
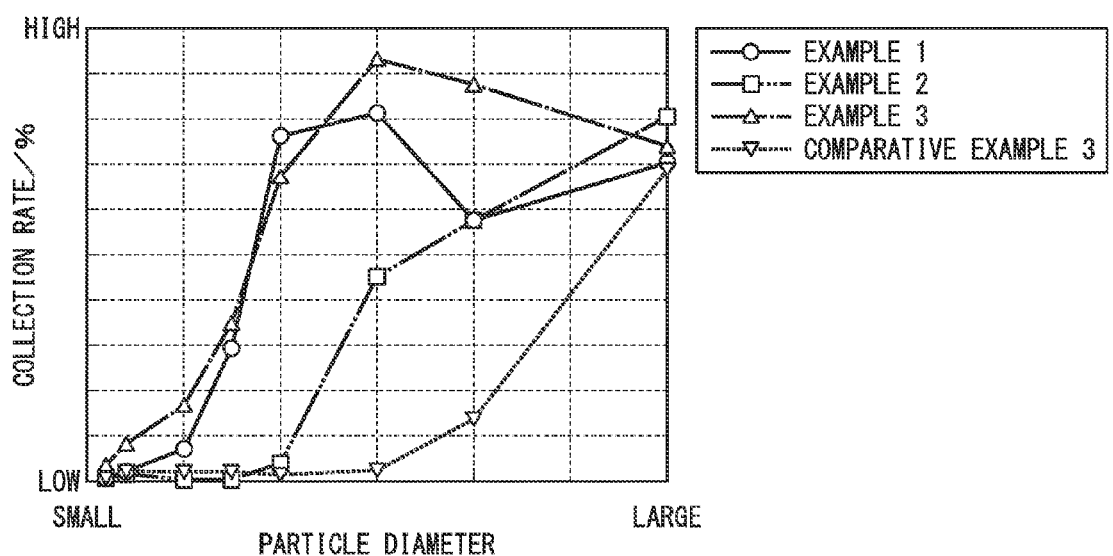
FIG. 7 is a graph illustrating the relationship between the particle diameters and the collection rates in Examples 1 to 3 of the invention and Comparative Example 3.
Figure 8:
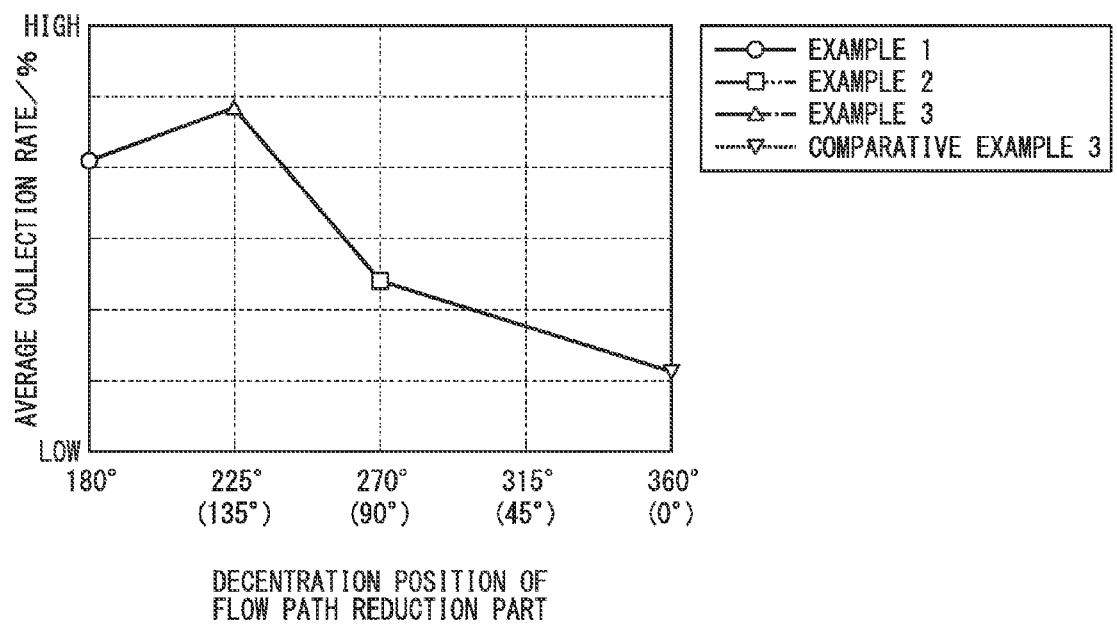
FIG. 8 is a graph illustrating the relationship between narrowed positions and average collection rates in Examples 1 to 3 of the invention and Comparative Example 3.

Additionally, as illustrated in FIGS. 7 and 8, the collection rates (FIG. 7) and average collection rates (FIG. 8) according to the particle diameters when the eccentric position of the flow path reduction part 331 of the reduction-expansion pipe 33 was changed were compared with one another regarding Examples 1 to 3 and Comparative Example 3. The collector 3a of Example 1, the collector 3b of Example 2, and the collector 3c of Example 3 in which the flow path reduction part 331 (330a, 331b, or 331c) is arranged on the side of the bent pipe inlet part 311 showed higher collection rates than the collector 3g of Comparative Example 3 in which the flow path reduction part 331 (331g) is present opposite to the side of the bent pipe inlet part 311. Among these examples, Example 1 in which the flow path reduction part 331a is arranged at the position of 180° that is the side of the bent pipe inlet part 311 and Example 3 in which the flow path reduction part 331c is arranged at the position of 225° that is the side of the bent pipe inlet part 311 showed high collection rates. Moreover, it was confirmed that the difference between the collection rates appears more markedly as the particle diameters are smaller, and Examples 1 and 3 exhibit high collection rates.

Figure 9:
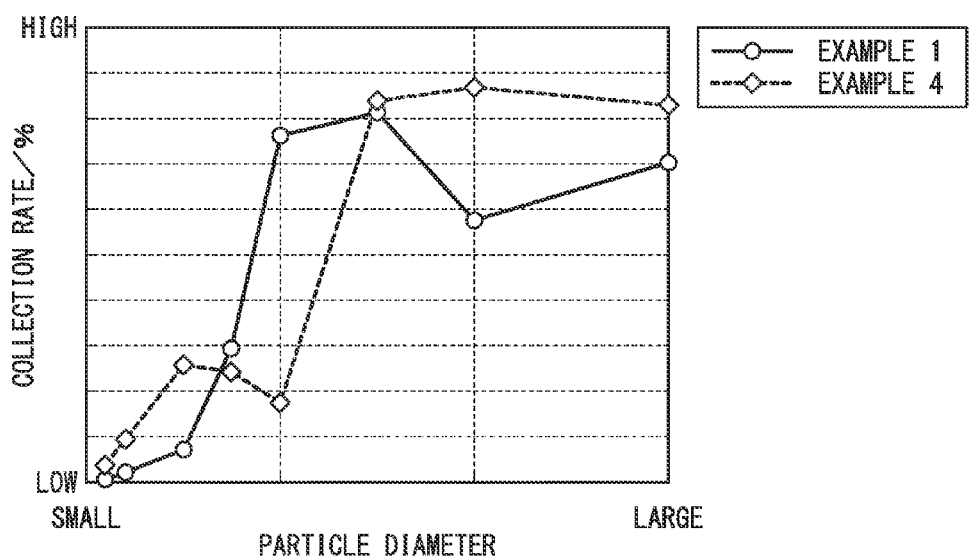
FIG. 9 is a graph illustrating the relationship between the particle diameters and the collection rates in Examples 1 and 5 of the invention.

Moreover, as illustrated in FIG. 9, the collection rates with respect to the particle diameters when the connecting position of the outlet pipe part 321 of the branch pipe 32 was arranged at a position opposite to the side of the bent pipe inlet part 311 were compared with each other regarding Examples 1 and 4. Both of the collector 3a of Example 1 having the outlet pipe part 321a connected thereto in the direction of 90° from the first direction X and the collector 3d of Example 4 having the outlet pipe part 321d connected thereto in the direction of 180° from the first direction X showed high collection rates. In other words, both of the collector 3a of Example 1 and the collector 3d of Example 4 in which the outlet pipe part 321 of the branch pipe 32 is connected at the positions of 90° and 180° from the position of the flow path reduction part 331 showed high collection rates.

It was found from these results that, if the reduction-expansion pipe 33 is used, the collection efficiency can be further improved, and the collection efficiency can be further improved especially by forming the reduction-expansion pipe 33 using the eccentric reducers 332.

Additionally, it was found that the reduction-expansion pipe 33 in which the flow path reduction part 331 (the flow path reduction part 331a, the flow path reduction part 331b, or the flow path reduction part 331c) is arranged on the side of the bent pipe inlet part 311 as in Examples 1 to 4 can further improve collection rates than the reduction-expansion pipe 33 in which the position of the flow path reduction part 331 (331g) is arranged opposite to the side of the bent pipe inlet part 311 as in Comparative Example 3.

Moreover, it was found that collection rates can be further improved if the connecting position of the outlet pipe part 321 in the branch pipe 32 is at a position opposite to the flow path reduction part 331 as in Examples 1 to 4.

It was found from the above that high collection rates are exhibited if the flow path reduction part 331 of the reduction-expansion pipe 33 is arranged within a range of 180° to 270° from the first direction X, and in particular, higher collection rates are exhibited if the flow path reduction part is arranged within a range of 180° to 225° from the first direction X. Additionally, it was found from a symmetric property that high collection rates are exhibited if the flow path reduction part 331 of the reduction-expansion pipe 33 is arranged within a range of 90° to 180° that is a range symmetrical to the range of 180° to 270°, with the first direction X as a reference. In particular, it is also clear that higher collection rates are exhibited if the flow path reduction part 331 of the reduction-expansion pipe 33 is arranged within a range of 135° to 180° that is a range symmetrical to the range of 180° to 225°, with the first direction X as a reference. That is, it was found that high collection rates are exhibited if the flow path reduction part 331 of the reduction-expansion pipe 33 is arranged within a range of 90° to 270° from the first direction X, and in particular, higher collection rates are exhibited if the flow path reduction part is arranged within a range of 135° to 225° from the first direction X. In other words, it was found that higher collection rates are exhibited if, when viewed in the second direction Z, the flow path reduction part 331 of the reduction-expansion pipe 33 is eccentric toward the radial side from the central axis C of the second line 22 which is the bent pipe inlet part 311 side with the central axis C as a reference.

Additionally, it was found that collection rates can be improved if the connecting position of the outlet pipe part 321 in the branch pipe 32 is a position of 90° to 180° and a position of 180° to 270° from the position of the flow path reduction part 331. In other words, it was found that the collection rates can be improved if, when viewed in the second direction Z, the outlet on the side connected to the strainer 13 of the branch pipe 32 is located opposite to the eccentric position of the flow path reduction part 331 with the central axis C of the outlet opening of the reduction-expansion pipe 33 as a reference.

Although the embodiment and the examples of the invention have been described above in detail with reference to the drawings, the components, combinations thereof, or the like in the above embodiment and examples are exemplary. Additions, omissions, substitutions, and other modifications of the components can be made without departing from the spirit of the invention. Additionally, the invention is not limited by the embodiment and the examples and is limited only by the appended claims.

Specifically, for example, in the above embodiment and examples, the second direction Z is a vertically downward direction. However, in the invention, the second direction only has to be directed to a vertically lower side than the first direction and the third direction. Additionally, in the above embodiment and examples, both of the first direction and the third direction are directions in the horizontal direction. However, in the invention, the first direction and the third direction only have to be directions including a horizontal direction component.

Although the eccentric reducers 332 are used as parts that form the flow path reduction part 331 in the above embodiment, the invention is not limited to this. For example, commercially well-known parts having a diameter-reduced structure, such as an orifice, may be used.

Additionally, although the target fluid is the gas fuel F in the present embodiment, the invention is not limited to this. For example, fluids, such as steam, may be targeted.

INDUSTRIAL APPLICABILITY

According to one aspect related to the invention, the collection efficiency of particles contained in a fluid can be improved.

REFERENCE SIGNS LIST

F: GAS FUEL
P: PARTICLES
1: GAS TURBINE PLANT
10: GAS TURBINE
C: COMPRESSOR
T: TURBINE
11: COMBUSTOR
G: GENERATOR
2: GAS LINE
12: GAS TANK
13: STRAINER
3: COLLECTOR
31: BENT PIPE
311: BENT PIPE INLET PART
312: BENT PART
313: BENT PIPE OUTLET PART
32: BRANCH PIPE
321: OUTLET PIPE PART
322: STRAIGHT PIPE PART
323: STRAIGHT PIPE INLET PART
324: STRAIGHT PIPE OUTLET PART
33: REDUCTION-EXPANSION PIPE
332: ECCENTRIC REDUCER
331: FLOW PATH REDUCTION PART
21: FIRST LINE
22: SECOND LINE
23: THIRD LINE
34: COLLECTION PIPE (COLLECTION PART)
341: OPENING AND CLOSING LID

The invention claimed is:

1. A gas turbine plant comprising:
a gas turbine having a compressor, a turbine, and a combustor;
a gas line that supplies gas fuel as a fluid to the combustor; and
a collector that collects particles contained in the fluid, the collector being arranged in the gas line and comprising:
a bent pipe that turns the direction of the fluid flowing in a first direction to a second direction that is directed to a vertically lower side than the first direction;
a reduction-expansion pipe that is connected to an outlet of the bent pipe and expands a flow path of the fluid flowing in the second direction after reducing the flow path of the fluid;
a branch pipe that is connected to an outlet of the reduction-expansion pipe and causes the fluid flowing in the second direction to branch into the second direction and a third direction that is a direction different from the second direction; and
a collection part that is connected to an outlet of the branch pipe on the second direction side and collects the particles in the fluid,
wherein a flow path reduction part in the reduction-expansion pipe is eccentric with respect to a center of an inlet opening of the reduction-expansion pipe, and when viewed in the second direction, an eccentric position of the flow path reduction part is within a range of 90° to 270° from the first direction, with the center of the inlet opening as a reference.

2. The collector according to claim 1,
wherein, when viewed in the second direction, the third direction is within a range of 90° to 270° from the eccentric position of the flow path reduction part, with a center of an outlet opening of the reduction-expansion pipe as a reference.

3. The collector according to claim 1,
wherein, when viewed in the second direction, an outlet of the branch pipe on the third direction side is opposite to the eccentric position of the flow path reduction part, with a center of an outlet opening of the reduction-expansion pipe as a reference.

4. A gas turbine plant comprising:
a gas turbine having a compressor, a turbine, and a combustor;
a gas line that supplies gas fuel as a fluid to the combustor; and
a collector that collects particles contained in the fluid, the collector being arranged in the gas line and comprising:
a bent pipe that turns the direction of the fluid flowing in a first direction to a second direction that is directed to a vertically lower side than the first direction;
a reduction-expansion pipe that is connected to an outlet of the bent pipe and expands a flow path of the fluid flowing in the second direction after reducing the flow path of the fluid;
a branch pipe that is connected to an outlet of the reduction-expansion pipe and causes the fluid flowing in the second direction to branch into the second direction and a third direction that is a direction different from the second direction; and
a collection part that is connected to an outlet of the branch pipe on the second direction side and collects the particles in the fluid,
wherein, when viewed in the second direction, a flow path reduction part in the reduction-expansion pipe is eccentric toward a side in a radial direction from a center of an inlet opening of the reduction-expansion pipe, the inlet opening of the reduction-expansion pipe being an outlet side of the bent pipe, with the center of the inlet opening as a reference.

5. The collector according to claim 4,
wherein, when viewed in the second direction, the third direction is within a range of 90° to 270° from an eccentric position of the flow path reduction part, with a center of an outlet opening of the reduction-expansion pipe as a reference.

6. The collector according to claim 4,
wherein, when viewed in the second direction, an outlet of the branch pipe on the third direction side is opposite to an eccentric position of the flow path reduction part, with a center of an outlet opening of the reduction-expansion pipe as a reference.

* * * * *